United States Patent
Itaya et al.

(10) Patent No.: US 9,564,166 B2
(45) Date of Patent: Feb. 7, 2017

(54) MAGNETIC-DISK GLASS SUBSTRATE AND MAGNETIC DISK

(71) Applicants: Masanobu Itaya, Minami-Alps (JP); Kinobu Osakabe, Tokorozawa (JP); Toshio Takizawa, Kai (JP)

(72) Inventors: Masanobu Itaya, Minami-Alps (JP); Kinobu Osakabe, Tokorozawa (JP); Toshio Takizawa, Kai (JP)

(73) Assignees: HOYA CORPORATION, Tokyo (JP); HOYA GLASS DISK VIETNAM II LTD., Yen Province (VN)

( * ) Notice: Subject to any disclaimer, the term of this patent is extended or adjusted under 35 U.S.C. 154(b) by 10 days.

(21) Appl. No.: 14/424,261

(22) PCT Filed: Jun. 28, 2013

(86) PCT No.: PCT/JP2013/067944
§ 371 (c)(1),
(2) Date: Feb. 26, 2015

(87) PCT Pub. No.: WO2014/034251
PCT Pub. Date: Mar. 6, 2014

(65) Prior Publication Data
US 2015/0213826 A1 Jul. 30, 2015

Related U.S. Application Data

(60) Provisional application No. 61/694,521, filed on Aug. 29, 2012.

(51) Int. Cl.
G11B 5/82 (2006.01)
G11B 5/73 (2006.01)

(52) U.S. Cl.
CPC ............... *G11B 5/82* (2013.01); *G11B 5/7315* (2013.01)

(58) Field of Classification Search
None
See application file for complete search history.

(56) References Cited

U.S. PATENT DOCUMENTS

| 7,875,374 | B2 | 1/2011 | Minazawa | |
|---|---|---|---|---|
| 2008/0291578 | A1* | 11/2008 | Ono | C03C 17/34 360/313 |
| 2009/0148725 | A1* | 6/2009 | Minazawa | G11B 5/7315 428/848 |

(Continued)

FOREIGN PATENT DOCUMENTS

| CN | 101312049 A | 11/2008 |
|---|---|---|
| CN | 101452708 A | 6/2009 |

(Continued)

OTHER PUBLICATIONS

Derwent Abstract of JP 2004-280961 A (pub. 2004).*

(Continued)

*Primary Examiner* — Kevin Bernatz
(74) *Attorney, Agent, or Firm* — Global IP Counselors, LLP

(57) ABSTRACT

A magnetic-disk glass substrate of the present invention has an average value of squares of inclinations of 0.0025 or less and a frequency at which squares of inclinations are 0.004 or more of 15% or less, in a case where samples of inclinations on a main surface are obtained at intervals of 10 nm.

16 Claims, 5 Drawing Sheets

THICKNESS BETWEEN MAGNETIC RECORDING LAYER AND SUBSTRATE IS LARGE.

THICKNESS BETWEEN MAGNETIC RECORDING LAYER AND SUBSTRATE IS SMALL.

(56) References Cited

U.S. PATENT DOCUMENTS

| | | | |
|---|---|---|---|
| 2009/0324995 A1 | 12/2009 | Todo et al. | |
| 2011/0171415 A1 | 7/2011 | Eda et al. | |
| 2015/0248910 A1* | 9/2015 | Itaya | G11B 5/7315 |
| | | | 428/836 |

FOREIGN PATENT DOCUMENTS

| | | | |
|---|---|---|---|
| JP | H05-067321 A | | 3/1993 |
| JP | H07-225943 A | | 8/1995 |
| JP | 2004280961 A | * | 10/2004 |
| JP | 2008-293552 A | | 12/2008 |
| JP | 2009-140584 A | | 6/2009 |
| JP | 2009-289370 A | | 12/2009 |
| JP | 2010-108592 A | | 5/2010 |

OTHER PUBLICATIONS

Japanese Version of Office Action in the corresponding Chinese Patent Application No. 201380045657.3 dated Oct. 8, 2015.
International Search Report in PCT/JP2013/067944 dated Oct. 1, 2013.

* cited by examiner

FIG. 1A RECORDING BIT INTERVAL IS LONG.
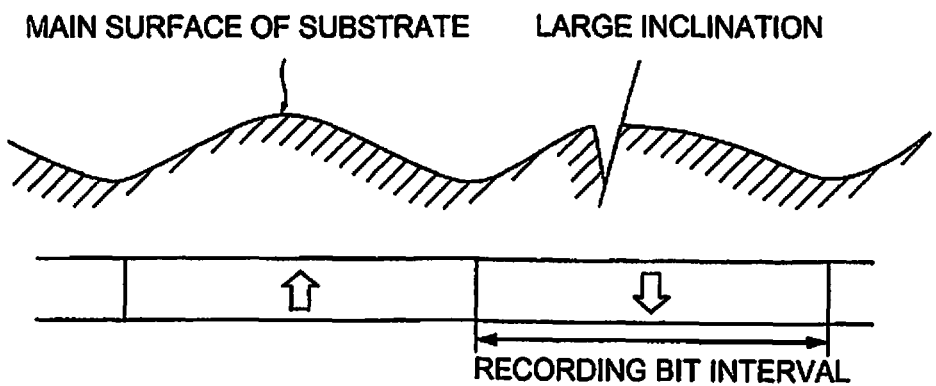
FIG. 1B RECORDING BIT INTERVAL IS SHORT.
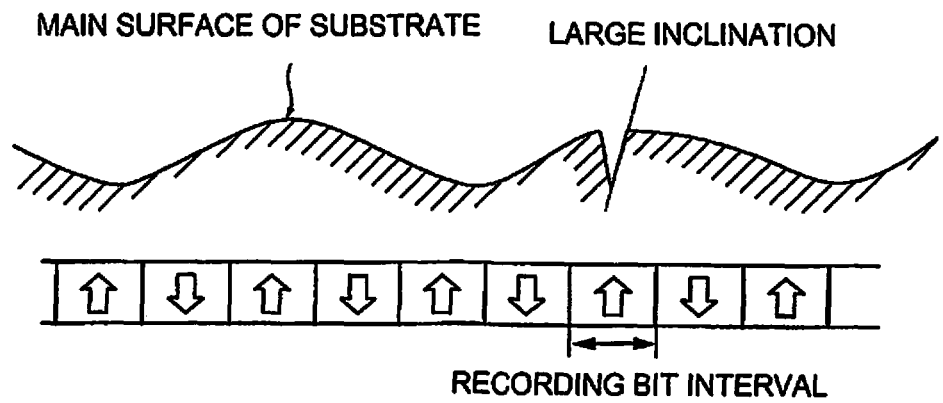

FIG. 2A THICKNESS BETWEEN MAGNETIC RECORDING LAYER AND SUBSTRATE IS LARGE.
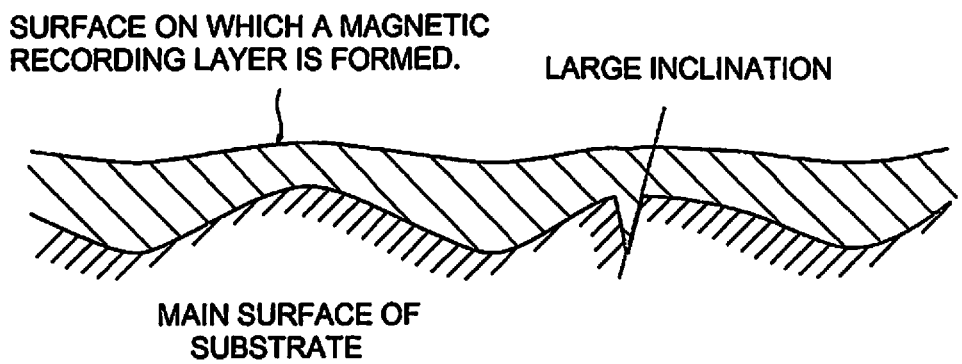
FIG. 2B THICKNESS BETWEEN MAGNETIC RECORDING LAYER AND SUBSTRATE IS SMALL.
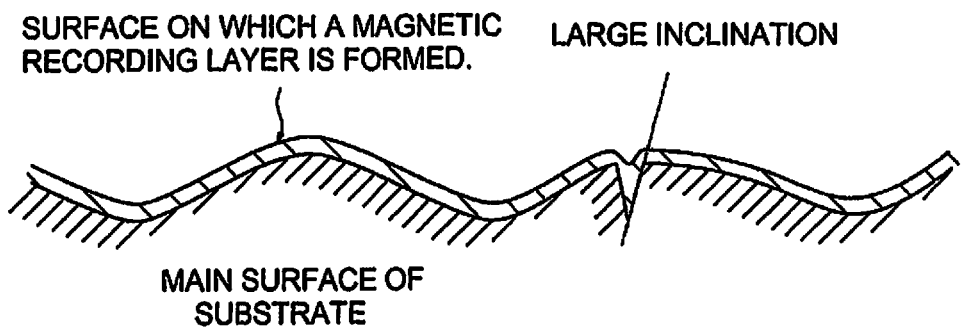

MAGNETIC-DISK GLASS SUBSTRATE AND MAGNETIC DISK

CROSS-REFERENCE TO RELATED APPLICATIONS

This U.S. National stage application claims priority under 35 U.S.C. §119(e) to U.S. Provisional Patent Application No. 61/694,521, filed on Aug. 29, 2012, the entire contents of U.S. Provisional Patent Application No. 61/694,521 are hereby incorporated herein by reference.

BACKGROUND

Field of the Invention

The present invention relates to a magnetic-disk glass substrate and a magnetic disk.

Background Information Art

Nowadays, personal computers, digital versatile disc (DVD) recorders, and the like have a built-in hard disk drive (HDD) for data recording. In particular, a magnetic disk in which a magnetic recording layer is provided on a glass substrate is used in a hard disk drive that is used in a device premised on portability, such as a notebook-type personal computer, and magnetic recording information is recorded on or read from the magnetic recording layer with a magnetic head that flies slightly above the surface of the magnetic disk. A glass substrate is unlikely to be plastically deformed compared with a metal substrate (aluminum substrate) and the like, and thus is preferably used as a substrate of the magnetic disk.

Moreover, the density of magnetic recording has been increased to meet the demand for an increase in the storage capacity of hard disk drives. For example, the magnetic recording information area (recording bit) has been made smaller using a perpendicular magnetic recording system that causes the direction of magnetization in the magnetic recording layer to be perpendicular to the surface of the substrate. A magnetic disk of the perpendicular magnetic recording system is obtained by forming an attaching layer, a soft magnetic layer (soft under layer: SUL), a base layer, a magnetic recording layer, a protecting layer, a lubricant layer, and the like in this order on a metal substrate or a glass substrate, for example. Employing the perpendicular magnetic recording system makes it possible to increase the storage capacity per disk substrate. Also, in order to further increase the storage capacity, the distance between the recording and reproducing element and the magnetic recording layer is made very short by causing the element of the magnetic head to project farther, thus further improving the accuracy of the recording and reproducing of information (improve the S/N ratio). It should be noted that such control of the recording and reproducing element of the magnetic head is called a dynamic flying height (DFH) control mechanism and a magnetic head equipped with this control mechanism is called a DFH head. A magnetic-disk glass substrate that is used in an HDD in combination with such a DFH head is produced such that the surface roughness of the substrate is significantly small, in order to prevent the substrate from colliding or coming into contact with the magnetic head and the recording and reproducing element that projects farther therefrom.

On the other hand, it is known that the surface shape of a magnetic-disk glass substrate affects the crystalline orientation dispersion ($\Delta\theta 50$; deviation of crystals from the perpendicular direction) of a specific crystal face, such as a Co (002) face or an Ru (002) face, of a magnetic particle in the magnetic recording layer formed on the substrate. $\Delta\theta 50$ is calculated as a half-value width of a peak in the case where $\theta/2\theta$ is measured with an X-ray diffractometer, a $2\theta$ value is measured from the peak top of the crystal face of the magnetic recording layer and a $\theta$ scan is performed while fixing the $2\theta$. The crystalline orientation dispersion $\Delta\theta 50$ is an index indicating the dispersion of an axis of easy magnetization, and the smaller this value is, the better. By improving the $\Delta\theta 50$ (i.e., by bringing the $\Delta\theta 50$ close to zero), it is possible to obtain excellent magnetic properties and to improve the signal-to-noise ratio (SNR), and therefore, it is possible to further increase the recording density.

Regarding the crystalline orientation dispersion ($\Delta\theta 50$), JP 2009-140584A describes a magnetic-disk glass substrate that is prepared not based on a surface roughness Ra but so as to have a root-mean-square value of inclination angles that is smaller than or equal to a predetermined value (for example, 5 degrees or less, and more preferably 3 degrees or less) in order to improve the crystalline orientation dispersion ($\Delta\theta 50$) and the SNR of the magnetic recording layer.

Moreover, JP 2008-293552A describes a magnetic-disk glass substrate in which the surface roughness Ra satisfies the relationship Ra≤0.15 nm and the average inclination angle is set to be 2 degrees or less. Using this substrate makes it possible to reduce $\Delta\theta 50$ and to reduce the medium noise (evaluated at a linear recording density of 825 kbpi using a TMR head of 130 Gbpsi). It should be noted that in the case where the linear recording density is 825 kbpi, a recording bit length (hereinafter, indicates a calculated value based on linear recording density) is about 30 nm.

SUMMARY

When the inventors of the present invention produced magnetic disks using magnetic-disk glass substrates (also referred to merely as "substrates" hereinafter) in which the surface roughness of the main surface of each substrate or the root-mean-square value of inclination angles (or the average inclination angle) thereof was set to be smaller than or equal to a predetermined value, it was found that there were cases where the SNR of reproduced signals from a magnetic disk having a high recording density was not necessarily improved despite the surface roughness or the root-mean-square value of inclination angles of the main surface being set to be sufficiently small and the $\Delta\theta 50$ being set to be sufficiently small. That is, it was found that as the surface roughness or the root-mean-square value of inclination angles of the main surface of the substrate decreased to a certain extent, the SNR of reproduced signals from a magnetic disk produced using this substrate was improved, but that there were cases where the SNR of the reproduced signals from the magnetic disk was not improved even when the surface roughness or the root-mean-square value of the main surface was further reduced beyond that extent.

In recent years, the amount of projection of the recording and reproducing element of the magnetic head has been increased in order to achieve a high recording density of, for example, 600 GB/P or greater, and thus the gap between the element and the magnetic disk becomes significantly small. As a result, writing is possible at a higher recording density than before. It is thought that magnetic disks will be made to have still higher recording densities in future, and that improving the SNR of reproduced signals from a magnetic disk having a high recording density will become an even more important factor.

Therefore, it is an object of the present invention to provide a magnetic-disk glass substrate and a magnetic disk with which the SNR of reproduced signals from a magnetic disk having a higher recording density than before can be improved.

In order to find out the cause for not observing an improvement in the SNR of the magnetic disk having a high recording density despite the surface roughness of the main surface or the root-mean-square value of inclination angles (or average inclination angle) of the main surface being set to be sufficiently small, the inventors of the present invention investigated the properties of the main surfaces of various substrates in detail. As a result, it was found that there were cases where the SNR of reproduced signals from magnetic disks were different even when the magnetic disks had main surfaces whose surface roughnesses or root-mean-square values of inclination angles (or average inclination angles) were substantially the same.

Therefore, regarding the surface shapes of various substrates, the inventors of the present invention focused on not the average value of the angles of inclinations on the main surface (root-mean-square value of inclination angles or average inclination angle) but the individual inclination values. As a result, it was found that the frequency of inclinations of minute gaps having a value that was equal to or greater than a predetermined value was high in the main surfaces of the substrates used in the magnetic disks having a high recording density that tended to have a relatively low SNR. It should be noted that, for example, regarding the properties of the main surface of a substrate, in the case where two predetermined points in a minute gap on the main surface are selected, the inclination is a value obtained by dividing the amount of change in height between the two points by the length of the minute gap.

The inventors of the present invention think that the reason why the SNR of a magnetic disk is not improved in the case where large inclinations exist due to the variation of the inclinations on the main surface is as follows.

That is, if a large inclination exists on the main surface of a substrate, it is thought that the direction of the crystalline orientation in a magnetic recording layer formed directly over the position on the substrate where the large inclination exists inclines significantly from the perpendicular direction or crystals do not epitaxially grow appropriately, resulting in defects. However, it is thought that such a problem does not manifest as reproduction noise in the case where a conventional recording bit length (e.g., about 30 nm as described above) is applied. This point will be described with reference to FIGS. 1A and 1B FIGS. 1A and 1B show shows the influence of cases where a portion with a large inclination exists on the substrate when the recording bit length is long and when the recording bit length is short. In the case where the recording bit length is long as shown in FIG. 1A, even if magnetic particles that incline from the perpendicular direction or become defects exist directly over the position where there is a large inclination on the substrate, a large number of other magnetic particles included in one recording bit length form a correct magnetic field, and therefore, it is assumed that correct signals are read out as a whole and signal quality is not affected.

On the other hand, when the recording bit length is short as shown in FIG. 1B due to a recording density being made higher, in the case where magnetic particles that incline from the perpendicular direction or become defects exist directly over the position where a large inclination exists on the substrate, the influence of the magnetic particles is relatively increased, and thus the possibility that reproduced signals from the area including those magnetic particles will be incorrect (that is, cause noise) increases. That is, in the case where the recording bit length is short, it is assumed that the SNR of a magnetic disk is not improved due to large inclinations existing on the main surface of the substrate. It is thought that the problem of the SNR of a magnetic disk not improving first became manifest because recording at a linear recording density of, for example, 2000 kbpi or greater (e.g., a recording bit length of about 12.70 nm or less) became possible. In particular, the recording bit length becomes significantly short in a magnetic disk having a high recording density, and therefore, the above-described problem becomes marked.

It should be noted that the inventors of the present invention compared $\Delta\theta 50$ of the magnetic disks having a high recording density in which a difference in the SNRs of the reproduced signals occurred, but no marked difference was observed. It is thought that the region on a substrate having a large inclination that affects the SNR is insignificant as a whole and was thus not detected with an X-ray diffractometer during the calculation of $\Delta\theta 50$. That is, $\Delta\theta 50$ is a half-value width of a peak observed by an X-ray diffractometer and is merely an index indicating variation of the axes of easy magnetization, and thus it is thought that even if half-value widths are the same as each other for example, variation of the axes of easy magnetization differs according to an extent of the spread of $\theta$ in a low X-ray intensity region.

The inventors of the present invention further think that the reason why large inclinations did not conventionally become manifest as reproduction noise in the case where the large inclinations existed on the main surface of a substrate is that the total thickness of an attaching layer and an SUL (i.e., the thickness of amorphous layers) was large. This point will be described with reference to FIGS. 2A and 2B. FIGS. 2A and 2B show the influence of the cases where a region having a large inclination exists on a substrate when the thickness between the substrate and a magnetic recording layer is large and when the thickness is small.

The total thickness of conventional amorphous metal layers such as an attaching layer (e.g., CrTi) and an SUL (e.g., FeCoTaZr) formed by sputtering or the like is relatively large (for example, about 50 nm or more), and therefore, even if irregular portions with a large inclination exist on the substrate, it is thought that the formed amorphous metal films have the effect of improving the irregular portions (i.e., reducing the inclinations) on the substrate, thus making the crystalline orientation of the magnetic particles in the magnetic recording layer favorable (in FIG. 2A).

However, in recent years, the thickness of an SUL has been reduced to, for example, 30 nm or less in order to reduce noise due to the magnetism of the SUL itself, and thus the effect of reducing the inclinations of the irregular portions in the substrate has decreased in FIG. 2B). Therefore, the above-described problem of the SNR of a magnetic disk not improving becomes more marked.

As a result of intensive research by the inventors of the present invention based on the above-described observations, it was found that the above-described problem can be solved by limiting the frequency of inclinations having a value that is greater than or equal to a predetermined value regarding the surface properties of the main surface of a magnetic-disk glass substrate, allowing the present invention to be achieved.

More specifically, a first aspect of the present invention is a magnetic-disk glass substrate in which an average value of squares of inclinations is 0.0025 or less and a frequency at which squares of inclinations are 0.004 or more is 15% or less, in a case where samples of inclinations on a main surface are obtained at intervals of 10 nm.

In the magnetic-disk glass substrate, it is preferable that the frequency at which squares of inclinations are 0.004 or more is 10% or less.

It is preferable that the magnetic-disk glass substrate is made of amorphous glass.

It is preferable that the magnetic-disk glass substrate is made of glass having a glass-transition temperature of 650° C. or more.

In the magnetic-disk glass substrate, it is preferable that an arithmetic average roughness Ra of the main surface is 0.15 nm or less.

A second aspect of the present invention is a magnetic disk having at least a magnetic recording layer formed on the surface of the above-described magnetic-disk glass substrate.

A third aspect of the present invention is a magnetic-disk glass substrate having a pair of flat main surfaces, wherein, after magnetic recording layers are formed above the main surfaces to produce a magnetic disk, a maximum value of an average value of squares of inclinations and a maximum value of a frequency at which square numbers of inclinations are 0.004 or more in a case where samples of inclinations on the main surfaces are obtained at intervals of 10 nm are determined such that a signal-to-noise ratio of reproduced signals when the signals are written in the magnetic recording layer at a linear recording density of 2000 kbpi or greater has a favorable level.

With a magnetic-disk glass substrate and a magnetic disk according to the present invention, it is possible to improve the SNR of reproduced signals from a magnetic disk having a high recording density.

BRIEF DESCRIPTION OF THE DRAWINGS

FIGS. 1A and 1B show the influence of cases where a portion having a large inclination exists on a magnetic-disk glass substrate when a recording bit length is long and when a recording bit length is short;

FIGS. 2A and 2B show the influence of cases where a portion having a large inclination exists on a substrate when the thickness between the substrate and a magnetic recording layer is large and when the thickness is small;

DESCRIPTION OF EMBODIMENTS

Figure 3:
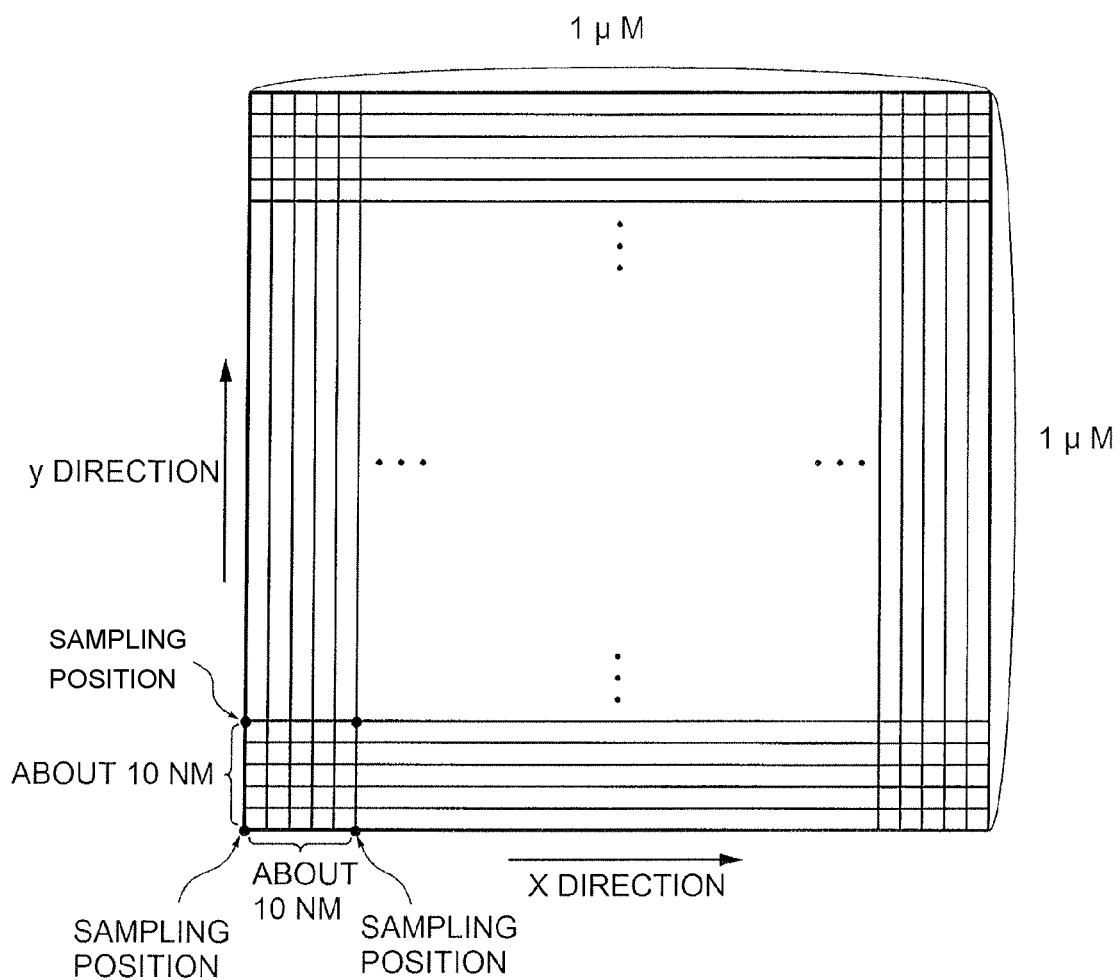
FIG. 3 is a drawing illustrating a method for measuring an inclination on a main surface of a magnetic-disk glass substrate.

Hereinafter, a method for manufacturing a magnetic-glass substrate of this embodiment will be described in detail.

[Magnetic-Disk Glass Substrate]

Aluminosilicate glass, soda-lime glass, borosilicate glass, or the like can be used as a material for the magnetic-disk glass substrate of this embodiment. In particular, aluminosilicate glass can be preferably used in that it can be chemically strengthened and a magnetic-disk glass substrate having excellent flatness of its main surface and excellent strength of the substrate can be produced. It is more preferable to use amorphous aluminosilicate glass.

Although there is no limitation on the composition of the magnetic-disk glass substrate of this embodiment, the glass substrate of this embodiment is amorphous aluminosilicate glass that preferably contains, in terms of oxide amount in mol %, $SiO_2$ in an amount of 50 to 75%, $Al_2O_3$ in an amount of 1 to 15%, at least one component selected from $Li_2O$, $Na_2O$ and $K_2O$ in a total amount of 5 to 35%, at least one component selected from MgO, CaO, SrO, BaO and ZnO in a total amount of 0 to 20%, and at least one component selected from $ZrO_2$, $TiO_2$, $La_2O_3$, $Y_2O_3$, $Ta_2O_5$, $Nb_2O_5$ and $HfO_2$ in a total amount of 0 to 10%.

Also, the glass substrate of this embodiment may be amorphous aluminosilicate glass that preferably contains, in mass %, $SiO_2$ in an amount of 57 to 75%, $Al_2O_3$ in an amount of 5 to 20% (it should be noted that the total amount of $SiO_2$ and $Al_2O_3$ is 74% or more), $ZrO_2$, $HfO_2$, $Nb_2O_5$, $Ta_2O_5$, $La_2O_3$, $Y_2O_3$ and $TiO_2$ in a total amount of more than 0% to 6% or less, $Li_2O$ in an amount of more than 1% to 9% or less, $Na_2O$ in an amount of 5 to 18% (it should be noted that a mass ratio $Li_2O/Na_2O$ is 0.5 or less), $K_2O$ in an amount of 0 to 6%, MgO in an amount of 0 to 4%, CaO in an amount of more than 0% to 5% or less (it should be noted that the total amount of MgO and CaO is 5% or less and the content of CaO is larger than that of MgO), and SrO+BaO in an amount of 0 to 3%.

Also, the glass substrate of this embodiment may contain, in terms of oxide amount in mass %, $SiO_2$: 45.60 to 60%,
$Al_2O_3$: 7 to 20%,
$B_2O_3$: 1.00 or more to less than 8%,
$P_2O_5$: 0.50 to 7%,
$TiO_2$: 1 to 15%, and
the total amount of RO (it should be noted that R represents Zn and Mg): 5 to 35%.

In this case, it is also preferable to use glass containing CaO in an amount of 3.00% or less, BaO in an amount of 4% or less, no PbO, no $As_2O_3$, no $Sb_2O_3$, no $Cl^-$ component, no $^-$ component, no $SO^{3-}$ component, and no $F^-$ component (second glass composition). By performing crystallization processing on such glass, crystallized glass can be obtained that contains one or more selected from $RAl_2O_4$ and $R_2TiO_4$ (it should be noted that R represents one or more selected from Zn and Mg) as a main crystal phase and in which the particle size of crystals in the main crystal phase is within a range of 0.5 nm to 20 nm, the degree of crystallization is 15% or less, and the specific gravity is 2.95 or less.

That is, crystallized glass may be used that contains $SiO_2$ in an amount of 45.60 to 60%, $Al_2O_3$ in an amount of 7 to 20%, $B_2O_3$ in an amount of 1.00 to 8% or less, $P_2O_5$ in an amount of 0.50 to 7%, $TiO_2$ in an amount of 1 to 15%, and RO (it should be noted that R represents Zn and Mg) in a total amount of 5 to 35%, CaO in an amount of 3.00% or less, BaO in an amount of 4% or less, no PbO component, no $As_2O_3$ component, no $Sb_2O_3$ component, no $Cl^-$ component, no $^-$ component, no $SO^{2-}$ component, no $F^-$ component, and one or more selected from $RAl_2O_4$ and $R_2TiO_4$ (it should be noted that R represents one or more selected from Zn and Mg) as a main crystal phase, and in which the particle size of crystals in the main crystal phase is within a range of 0.5 nm to 20 nm, the degree of crystallization is 15% or less, and the specific gravity is 2.95 or less.

Also, the composition of glass used in this embodiment is, for example, $SiO_2$: 35 to 65 mol %,
$Al_2O_3$: 5 to 25 mol %,
MgO: 10 to 40 mol %, and
$TiO_2$: 5 to 15 mol %.

In this case, a glass composition (first glass composition) in which the total amount of the above components is 92 mol % or more is preferable. By performing crystallization processing on such glass, crystallized glass can be obtained that contains enstatite and/or a solid solution thereof as a main crystal.

The magnetic-disk glass substrate of this embodiment is a thin glass substrate with an annular shape. Although there is no limitation on the size of the magnetic-disk glass substrate, the magnetic-disk glass substrate is preferable, for example, as a magnetic-disk glass substrate with a nominal diameter of 2.5 inches.

On a main surface of the magnetic-disk glass substrate of this embodiment, in the case where samples of an inclination are obtained at intervals of about 10 nm, the average value of the squares of the inclinations is 0.0025 or less and the frequency at which the squares of the inclinations are 0.004 or more is 15% or less. It is more preferable that the frequency at which the squares of the inclinations are 0.004 or more is 10% or less. By causing the main surface to have such a shape, the number of the portions in which large inclinations are formed on the main surface is significantly reduced. Therefore, there will be very few regions where the crystalline orientation in the magnetic recording layer formed on the magnetic-disk glass substrate is largely inclined from the perpendicular direction with respect to the main surface, and that crystals do not grow appropriately.

It should be noted that the object of the present invention cannot be achieved only by reducing the variation of the inclinations on the main surface of the glass substrate. Although the frequency of the large inclinations on the main surface tends to decrease by reducing the variation of the inclinations (such as the dispersion of the inclinations) on the main surface, the distribution of the inclinations themselves does not necessarily follow a normal distribution. Therefore, even in the case where the variations of the inclinations are the same, the frequencies of inclusion of large inclinations are sometimes significantly different. If the frequency of inclusion of large inclinations increases, there is a possibility that magnetic signals from the portions in which the large inclinations exists cause noise. Therefore, by reducing the frequency at which the squares of the inclinations are greater than or equal to a specific value in addition to the frequency at which the average value of the squares of the inclinations is smaller than or equal to a predetermined value, a glass substrate can be obtained that includes a small number of the large inclinations on its main surface.

In particular, a recording bit length becomes significantly short in a magnetic disk having a high recording density. However, even in this case, the SNR of reproduced signals from the magnetic disk is improved.

A method for measuring inclinations on a main surface of a magnetic-disk glass substrate (referred to merely as "substrate" hereinafter) will be described. Inclinations on the main surface are measured using an atomic force microscope (AFM). Data observed with an AFM is data of a height $Z(x,y)$ at positions arranged at the equal intervals in a measurement plane (x-y plane) of the substrate.

For example, as shown in FIG. 3, the height $Z(x,y)$ at respective positions that divide both the x direction and the y direction of a measurement region of 1 μm square on the main surface of the substrate into 512 is measured, and the root-mean-square inclination Sdq is calculated based on the values of $Z(x,y)$ at intervals of about 10 nm (more precisely 9.76 nm) in accordance with the following equation 1.

The "average value of the squares of the inclinations" in the present invention is a square of the root-mean-square inclination Sdq.

$$Sdq = \sqrt{\frac{1}{A}\iint_A \left[\left(\frac{\partial Z(x,y)}{\partial x}\right)^2 + \left(\frac{\partial Z(x,y)}{\partial y}\right)^2\right]dxdy} \quad \text{(Equation 1)}$$

On the other hand, the inclination dq on the main surface at a minute gap (about 10 nm) between the neighboring sampling positions is represented by the following equation 2.

The "square of the inclination" in the present invention is a square of the inclination dq.

$$dq = \sqrt{\left[\left(\frac{\partial Z(x,y)}{\partial x}\right)^2 + \left(\frac{\partial Z(x,y)}{\partial y}\right)^2\right]} \quad \text{(Equation 2)}$$

It should be noted that it is preferable that the distance between the neighboring sampling positions is close to the recording bit length of a magnetic disk having a high recording density. Measuring inclinations at resolution close to the recording bit length makes it easy to correlate a measurement value with the crystalline orientation of the magnetic particles included in one recording bit of a magnetic recording layer, and in turn, with the SNR of reproduced signals. For example, it is preferable that the length of the gap between the sampling positions is set to be about half to two times the recording bit length to be assumed (for example, about 12.70 nm or less at a recording density of 2000 kbpi or greater).

In the present invention, for example, "the frequency at which the squares of the inclinations are 0.004 or more is 15% or less" means that the ratio (or proportion) of the number of samples in which the squares of the inclinations are 0.004 or more to the number of samples for the squares of the inclinations obtained in the main surface is 15% or less.

In the case where sampling is performed at intervals of about 10 nm, the average value of the squares of the inclinations is 0.0025 or less and the frequency at which the squares of the inclinations are 0.004 or more is 15% or less in the magnetic-disk glass substrate of this embodiment. Therefore, when a magnetic disk is produced using this glass substrate, the SNR of the magnetic disk is improved.

It should be noted that it is preferable to use amorphous glass for the magnetic-disk glass substrate of this embodiment as described above because it becomes possible to smooth the main surface with high accuracy and to easily reduce the frequency of inclinations having a large angle. Moreover, by chemically strengthening the above-described amorphous glass, it is possible to form a compressive stress layer on the surface layer and to enhance the impact resistance of the magnetic-disk glass substrate.

Crystallized glass (crystal glass) may be used for the magnetic-disk glass substrate of this embodiment. Using crystallized glass makes it possible to enhance the hardness of the glass substrate and to enhance the impact resistance thereof.

[Method for Manufacturing Magnetic-Disk Substrate]

Hereinafter, a method for manufacturing a magnetic-disk glass substrate of this embodiment will be described for each processing. It should be noted that the processing order may be changed as appropriate.

(1) Raw Glass Plate Molding and Rough Grinding Processing

After forming a sheet of plate glass by, for example, a float method, a raw glass plate having a predetermined shape from which a magnetic-disk glass substrate is to be made is cut out from this sheet of plate glass. A raw glass plate may also be molded by, for example, pressing using an upper mold and a lower mold instead of a float method. It should be noted that a method for manufacturing a raw glass plate is not limited to these methods and a raw glass plate can also be manufactured by a known manufacturing method such as a down draw method, a redraw method or a fusion method.

It should be noted that rough grinding processing using free abrasive grains may be performed on two main surfaces of the raw glass plate as needed.

(2) Inner Hole Forming Processing

An inner hole is formed in the center of the raw glass plate using, for example, a cylindrical drill, and thus an annular raw glass plate is obtained.

(3) Shaping Processing

After the inner hole forming processing, shaping processing in which chamfered portions are formed at the end portions (outer circumferential end portion and inner circumferential end portion) is performed. In the shaping processing, the outer circumferential end portion and the inner circumferential end portion of the annular raw glass plate are chamfered with a grindstone using diamond abrasive grains, or the like, and thus the chamfered portions are formed. Also, the outer diameter and the inner diameter may be adjusted simultaneously at this time.

(4) End Surface Polishing Processing

Next, the end surfaces of the annular raw glass plate are polished.

In the end surface polishing, the side wall surface (end surface) on the inner circumference side of the raw glass plate and the side wall surface (end surface) on the outer circumference side thereof are given a mirror finish by performing brushing. In this case, a slurry containing fine grains of cerium oxide, zirconium oxide or the like as free abrasive grains is used. By polishing the end surfaces, contamination by attached waste and the like, and damage or impairment such as scratches on the side wall surfaces of the raw glass plate are eliminated, and therefore, it is possible to prevent thermal asperity and the deposition of ions such as sodium and potassium that causes corrosion.

(5) Precision Grinding Processing

In precision grinding processing, the main surfaces of the annular raw glass plate are ground using a double-side grinding device provided with a planetary gear mechanism. The machining allowance in grinding is, for example, about several micrometers to 100 micrometers. The double-side grinding device has a pair of upper and lower surface plates (upper surface plate and lower surface plate) and the annular raw glass plate is held between the upper surface plate and the lower surface plate. The raw glass plate and the surface plates are relatively moved by moving one or both of the upper surface plate and the lower surface plate, so that two main surfaces of the raw glass plate can be ground. A surface plate in which fixed abrasive grains obtained by fixing abrasive grains made of diamond or the like with a resin are stuck on its surface can be used as the surface plate.

(6) First Polishing (Main Surface Polishing) Processing

Next, the first polishing is performed on the ground main surfaces of the raw glass plate. The machining allowance in the first polishing is, for example, about several micrometers to 50 micrometers. The first polishing is performed in order to eliminate scratches and distortion that remain on the main surfaces due to grinding with fixed abrasive grains and to adjust waviness and minute waviness. For example, cerium oxide abrasive grains or zirconia abrasive grains (grain size: diameter of about 1 to 2 μm) that are suspended in a slurry are used as the free abrasive grains for the first polishing.

(6-1) Polishing Device

Figure 4:
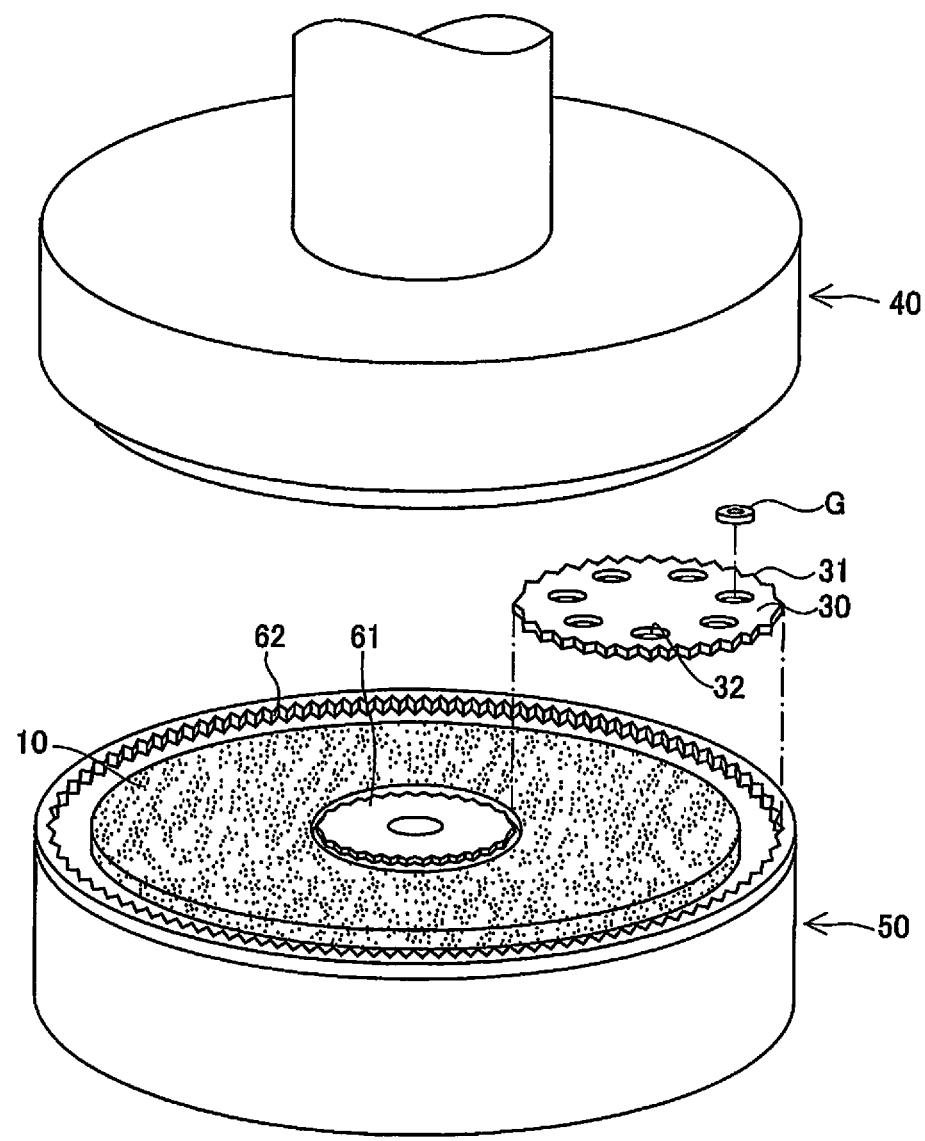
FIG. 4 is an exploded perspective view of a polishing device (double-side polishing device) used in first polishing processing.
Figure 5:
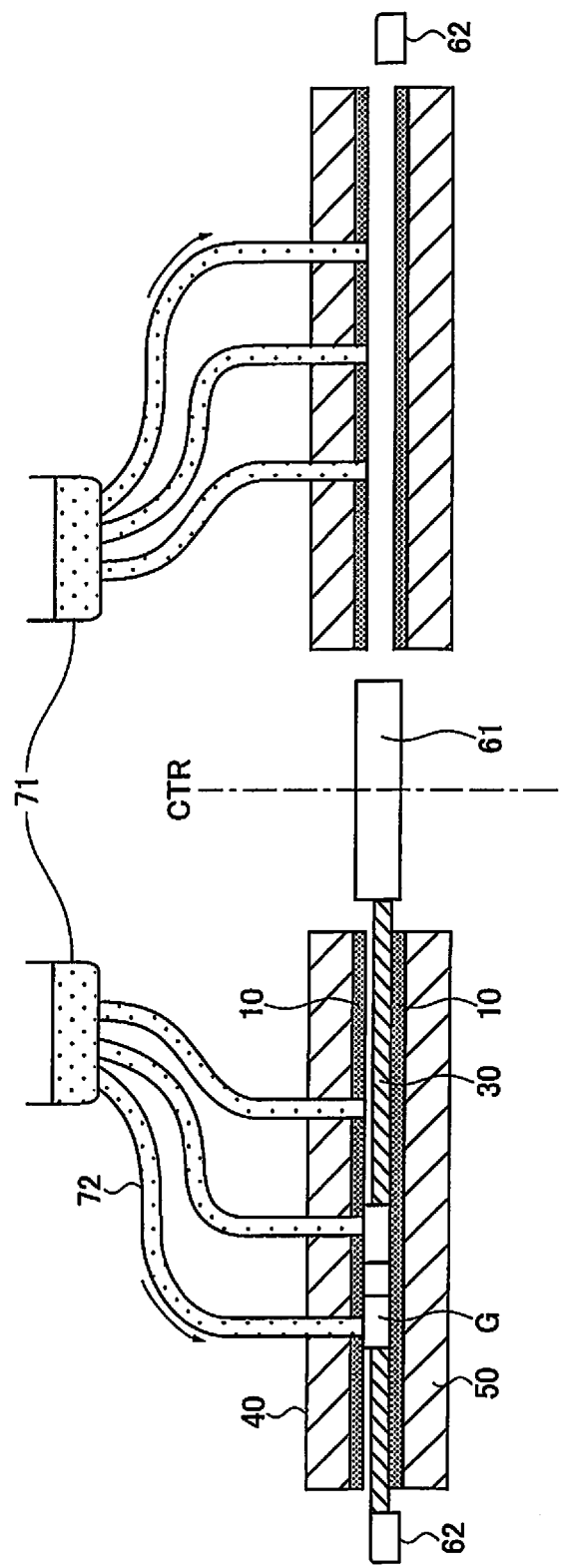
FIG. 5 is a cross-sectional view of the polishing device (double-side polishing device) used in first polishing processing.

A polishing device used in the first polishing processing will be described with reference to FIGS. 4 and 5. FIG. 4 is an exploded perspective view of the polishing device (double-side polishing device) used in the first polishing processing. FIG. 5 is a cross-sectional view of the polishing device (double-side polishing device) used in the first polishing processing. It should be noted that a configuration similar to this polishing device can also be applied in the grinding device used in the grinding processing described above.

As shown in FIG. 4, the polishing device has a pair of upper and lower surface plates, that is, an upper surface plate 40 and a lower surface plate 50. An annular raw glass plate G is held between the upper surface plate 40 and the lower surface plate 50, and the raw glass plate G and the surface plates are relatively moved by moving one or both of the upper surface plate 40 and the lower surface plate 50, so that two main surfaces of the raw glass plate G can be polished.

The configuration of the polishing device will be more specifically described with reference to FIGS. 4 and 5.

In the polishing device, planar polishing pads 10 having an annular shape as a whole are attached to the upper surface of the lower surface plate 50 and the bottom surface of the upper surface plate 40. A carrier 30 has a toothing 31 that is provided on its outer circumferential portion and is meshed with a sun gear 61 and an inner gear 62, and one or more hole portions 32 for accommodating and holding the raw glass plate G. The sun gear 61, the inner gear 62 provided on the outer edge and the disc-shaped carrier 30 constitute, as a whole, a planetary gear mechanism that has a central axis CTR as the center. The disc-shaped carrier 30 is meshed with the sun gear 61 on the inner circumferential side and with the inner gear 62 on the outer circumferential side, and accommodates and holds one or more raw glass plates G (workpieces). On the lower surface plate 50, the carrier 30 revolves around the sun gear while rotating on its own axis as a planetary gear, and the raw glass plate G and the lower surface plate 50 are moved relative to each other. For example, when the sun gear 61 rotates in a counterclockwise (CCW) direction, the carrier 30 rotates in a clockwise (CW) direction and the inner gear 62 rotates in the CCW direction. As a result, the polishing pad 10 and the raw glass plate G are moved relative to each other. The raw glass plate G and the upper surface plate 40 may be moved relative to each other in the same manner.

During the relative motion described above, the upper surface plate 40 is pressed against the raw glass plate G (that is, in a vertical direction) with a predetermined load, and the polishing pad 10 is pressed against the raw glass plate G. Moreover, a polishing liquid (slurry) is supplied between the raw glass plate G and the polishing pad 10 from a polishing liquid supplying tank 71 via one or more pipes 72 with a pump (not shown). The main surfaces of the raw glass plate G are polished by a polishing material contained in this polishing liquid.

It should be noted that although any material can be used for the polishing pad, it is preferable to use a polishing pad with a resin polisher made of polyurethane.

It should be noted that in this polishing device, it is preferable that the load from the upper surface plate 40 that is applied to the raw glass plate G is adjusted in order to set a desired polishing load with respect to the raw glass plate G. The load is preferably 50 g/cm$^2$ or more, more preferably 70 g/cm$^2$ or more, and even more preferably 90 g/cm$^2$ or more, for the purpose of achieving a high polishing speed. Moreover, the polishing load is preferably 180 g/cm$^2$ or less, more preferably 160 g/cm$^2$ or less, and even more preferably 140 g/cm$^2$ or less, for the purpose of reducing scratches and stabilizing quality. That is, the load is preferably 50 to 180 g/cm$^2$, more preferably 70 to 160 g/cm$^2$, and even more preferably 90 to 140 g/cm$^2$.

The supplying speed of the polishing liquid during the polishing processing is varied in accordance with the polishing pad 10, the composition and concentration of the polishing liquid and the size of the raw glass plate G, but is preferably 500 to 5000 ml/minute, more preferably 1000 to 4500 ml/minute, and even more preferably 1500 to 4000 ml/minute, for the purpose of enhancing the polishing speed. The rotation rate of the polishing pad 10 is preferably 10 to 50 rpm, more preferably 20 to 40 rpm, and even more preferably 25 to 35 rpm.

In the first polishing processing, polishing is performed such that the main surface of the raw glass plate has a roughness (Ra) of 0.5 nm or less and a micro-waviness (MW-Rq) of 0.5 nm or less in terms of the surface roughness.

Here, the micro-waviness can be expressed as an RMS (Rq) value that is calculated as the roughness in a wavelength bandwidth of 100 to 500 μm in a main surface region, and can be measured with an optical surface shape measurement device, for example.

The roughness of the main surface is expressed as the arithmetic average roughness Ra defined by JIS B0601: 2001, and can be measured with an AFM, for example. Herein, the arithmetic average roughness Ra measured with a resolution of 512 by 512 pixels in a measurement area of 1 μm square can be used.

(7) Chemical Strengthening Processing

Next, the raw glass plate on which the first polishing has been performed is chemically strengthened.

For example, a mixed solution of potassium nitrate and sodium sulfate can be used as a chemical strengthening liquid.

In this manner, by immersing the raw glass plate in the chemical strengthening liquid, lithium ions and sodium ions in the surface layer of the raw glass plate are respectively exchanged with sodium ions and potassium ions with a relatively large ion radius in the chemical strengthening liquid, and the raw glass plate is strengthened.

(8) Second Polishing Processing

Next, final polishing is performed, using the same double-side polishing device as used in the first polishing, on the raw glass plate that has been chemically strengthened and sufficiently cleaned. In this case, a polishing pad with a soft polisher (suede) (for example, polyurethane foam with an Asker C hardness of 75) as a resin polisher is used. It is preferable that the hardness of the polishing pad is set to be within a range of 60 to 90 in an Asker C hardness. This second polishing processing is mirror-polishing processing to finish the main surfaces of the glass substrate into smooth mirror surfaces with a surface roughness of 0.15 nm or less in Ra while retaining the flat surfaces obtained in the first polishing processing described above. RO water in which colloidal silica (average grain diameter (D50): 10 to 50 nm) is dispersed and a predetermined amount of aluminum sulfate is added and dissolved is used as the polishing liquid. It is preferable that the concentration of aluminum sulfate is set to 0.001 to 1 mol/L. Here, it should be noted that the average grain diameter (D50) denotes a grain diameter at which a cumulative curve reaches 50% when the cumulative curve is found by setting the entire volume of powder particles in the grain diameter distribution measured by a light scattering method to 100%, and is a value obtained by measuring grain diameters using, for example, a grain diameter/grain size distribution measurement device.

Subsequently, rinsing processing is performed using the same double-side polishing device as is. In the rinsing processing, for example, RO water in which an appropriate amount of aluminum sulfate has been added and dissolved is used as a processing liquid to be supplied between the polishing pad and the glass substrate. It is sufficient that the concentration of aluminum sulfate is the same as described above.

The glass substrate on which the rinsing processing has been performed is immersed in a cleaning bath, subjected to ultrasonic cleaning, and then dried, and thus a magnetic-disk glass substrate is obtained. It should be noted that if the glass substrate is cleaned using an acidic cleaning liquid, the main surface becomes rough and the variation of inclinations on the main surface increases, and therefore, it is preferable to use a neutral cleaning liquid or an alkaline cleaning liquid. It should be noted that when using a neutral cleaning liquid or an alkaline cleaning liquid, it is preferable that the pH of the cleaning liquid is set to be within a range of 6 to 11. Also, it is preferable not to use an acidic cleaning liquid whose pH is 5 or less.

A magnetic-disk glass substrate in which the variation of inclinations on the main surface is small and the frequency of large inclinations is small is obtained through the second polishing processing, rinsing processing and cleaning. That is, in the case where samples of an inclination are obtained at intervals of about 10 nm, a magnetic-glass substrate in which the average value of the squares of the inclinations is 0.0025 or less and the frequency at which the squares of the inclinations are 0.004 or more is 15% or less is obtained. It should be noted that the magnitude of the inclination on the main surface can be adjusted as appropriate by the polishing time, rinsing time and cleaning time.

The method for manufacturing a magnetic-disk glass substrate of this embodiment has been described above for each processing, but the processing order is not limited to the above-described order. Moreover, chemical strengthening process may be omitted depending on an application or a glass composition of the magnetic-disk glass substrate.

[Magnetic Disk]

A magnetic disk is a magnetic recording medium having a magnetic recording layer on the magnetic-disk glass substrate of this embodiment.

A magnetic disk has a configuration in which, for example, at least an attaching layer, a base layer, a magnetic recording layer, a protecting layer and a lubricant layer are laminated on the main surface of the magnetic-disk glass substrate (referred to as "substrate" as appropriate hereinafter) in this order from the side of the main surface.

For example, the substrate is introduced into a film deposition device that has been evacuated and the layers from the attaching layer to the magnetic recording layer are sequentially formed on the main surface of the substrate in an Ar atmosphere by a DC magnetron sputtering method.

For example, CrTi can be used in the attaching layer and CrRu can be used in the base layer. A CoPt based alloy can be used in the magnetic recording layer. After the film deposition as described above, by forming the protecting layer using $C_2H_4$ by, for example, a CVD method and performing nitriding processing that introduces nitrogen to the surface in the same chamber, a magnetic recording medium can be formed. Thereafter, by coating the protecting layer with perfluoropolyether (PFPE) by a dip coat method, the lubricant layer can be formed.

In addition, a soft under layer (SUL), a seed layer, an intermediate layer and the like may be formed between the attaching layer and the magnetic recording layer by a known film deposition method such as a sputtering method (including a DC magnetron sputtering method, RF magnetron sputtering method, and the like) or a vapor deposition method. It is possible to refer to, for example, JP 2009-110626A, paragraphs [0027] to [0032] for detailed description on the above-described layers.

It should be noted that as described above, using the magnetic-disk glass substrate of this embodiment makes it possible to obtain a high SNR even if the thickness of the SUL is 30 nm or less.

It should be noted that the composition of the magnetic-disk glass substrate of this embodiment may include $SiO_2$, $Li_2O$ and $Na_2O$, and one or more alkaline earth metal oxides selected from the group consisting of MgO, CaO, SrO and BaO as essential components, the molar ratio of the content of CaO to the total content of MgO, CaO, SrO and BaO (CaO/(MgO+CaO+SrO+BaO)) may be 0.20 or less, and the glass-transition temperature may be 650° C. or higher. The magnetic-disk glass substrate having such a composition is preferably for a magnetic-disk glass substrate to be used in a magnetic disk for energy-assisted magnetic recording.

It is thought that it is preferable to use a high Ku magnetic material to form a magnetic recording layer in a magnetic disk for energy-assisted magnetic recording. For example, the magnetic recording layer can be made of an L10 ordered alloy including a magnetic material containing an alloy of Pt, and Fe and/or Co as a main component. In order to obtain such a magnetic recording layer, the magnetic material containing an alloy of Pt, and Fe and/or Co as a main component is deposited on the main surface of the substrate, and then annealing processing for ordering the layer is performed. Here, the above annealing processing is generally performed at a high temperature of higher than 500° C. Accordingly, if glass constituting the substrate has poor heat resistance, the glass is deformed at a high temperature and flatness is impaired. In contrast, the substrate having the above-described composition exhibits superior heat resistance (glass-transition temperature of 650° C. or higher), and therefore, high flatness can be retained after annealing processing.

It should be noted that crystallized glass may be used for the magnetic-disk glass substrate of this embodiment.

In the case where crystallized glass is formed by crystallizing processing, it is sufficient to perform the following processing. Specifically, for example, a plurality of glass substrates sandwiching disc-shaped plates called a setter between each of them are introduced into a heating furnace and subjected to heating processing. The setters can be made of ceramics. In the heating processing, the glass substrate is crystallized by, for example, being held at a nucleus forming temperature for a predetermined period of time and then being held at a crystal growing temperature for a predetermined period of time. The temperature and the period of time for nucleus formation and crystal growth are set as appropriate depending on the glass composition of the glass substrate. When the glass substrate is cooled after being heated, it is preferable to adjust a cooling speed during slow cooling such that distortion and bending do not occur in the glass substrate.

It is possible to determine whether or not the glass substrate subjected to crystallizing processing is crystallized using, for example, a diffraction intensity distribution obtained by powder X-ray diffractometry. It should be noted that it is preferable to precipitate crystals whose average particle size in the crystal phase is 10 nm or less for the purpose of reducing the surface roughness of the main surface of the glass substrate.

Glass that has been crystallized (referred to as "crystallized glass" hereinafter) is a material configured to have crystals precipitated inside the glass by heating amorphous glass, and can be distinguished from amorphous glass.

In this embodiment, the Young's modulus of the glass substrate on which the crystallizing processing has been performed is preferably 100 GPa or more, and more preferably 120 GPa or more. Thus, it is possible to obtain a glass substrate with high flexural strength and high impact resistance. The flexural strength of the glass substrate on which the crystallizing processing has been performed is preferably 7 kgf or more, and particularly preferably 8 kgf or more for the purpose of enhancing the impact resistance. Thus, it is possible to obtain a magnetic-disk glass substrate that is preferably for a hard disk drive (HDD) with a high rotation rate of 10000 rpm or more.

Working Examples and Comparative Examples

In order to confirm the effect of the method for manufacturing a magnetic-disk glass substrate according to this embodiment, a 2.5-inch magnetic disk was produced from the manufactured glass substrate. The glass composition 1 of the produced magnetic-disk glass substrate is as follows.

(Glass Composition 1)

Amorphous aluminosilicate glass was used that contained, in mass %, $SiO_2$ in an amount of 65.08%, $Al_2O_3$ in an amount of 15.14%, $Li_2O$ in an amount of 3.61%, $Na_2O$ in an amount of 10.68%, $K_2O$ in an amount of 0.35%, MgO in an amount of 0.99%, CaO in an amount of 2.07%, $ZrO_2$ in an amount of 1.98%, and $Fe_2O_3$ in an amount of 0.10%, and that had a glass-transition temperature of 510° C.

[Production of Magnetic-Disk Glass Substrate of Working Examples and Comparative Examples]

Each type of processing of the method for manufacturing a magnetic-disk glass substrate according to this embodiment was performed in the given order.

Here, the pressing method was used in molding of the raw glass plates in step (1). In the rough grinding processing, alumina-based free abrasive grains were used.

In the end surface polishing in step (4), cerium oxide was used as the free abrasive grains, and polishing was performed using a polishing brush.

In the precision grinding in step (5), grinding was performed using a grinding device in which fixed abrasive grains obtained by fixing diamond abrasive grains with resin bond were attached to the surface of a surface plate.

In the first polishing in step (6), polishing was performed using the polishing device shown in FIGS. 4 and 5 for 60 minutes. Cerium oxide abrasive grains having an average grain diameter of 1 μm were used, and a hard urethane pad was used as the polishing pad.

In the chemical strengthening in step (7), a mixed solution of potassium nitrate (60 wt %) and sodium nitrate (40 wt %), or the like was used as a chemical strengthening liquid, the chemical strengthening liquid was heated to 350° C., and the raw glass plate that had been preheated to 200° C. in advance was immersed in the chemical strengthening liquid for 4 hours.

In the second polishing in step (8), polishing was performed using another polishing device similar to the polishing device shown in FIGS. 4 and 5. A polishing pad with a soft polisher (suede) (polyurethane foam with an Asker C hardness of 75) was used. RO water in which colloidal silica (average grain diameter (D50): 30 nm) was dispersed and aluminum sulfate was added and dissolved in an amount of 0.01 mol/L was used as the polishing liquid. A load of 100 g/cm$^2$ was applied, and the machining allowance for polishing was 5 μm. Subsequently, the rinsing processing was performed using the same polishing device as is. In the rinsing processing, RO water in which aluminum sulfate was added and dissolved in an amount of 0.01 mol/L was used as a processing liquid to be supplied between the polishing pad and the glass substrate. A load of 100 g/cm$^2$ was applied, and the processing time was set to 5 minutes. The glass substrate on which the above-described rinsing processing had been performed was immersed in respective cleaning baths filled with a neutral detergent, an alkaline cleaning liquid (pH: 10 or less), pure water, and IPA so as to be subjected to ultrasonic cleaning, and then was dried with IPA (steam drying). Thus, a magnetic-disk glass substrate was obtained. The produced magnetic-disk glass substrate was used as a substrate for a magnetic disk with a nominal diameter of 2.5 inches (having an inner diameter of 20 mm, an outer diameter of 65 mm, and a thickness of 0.635 mm).

Inclinations of the main surface were adjusted by the polishing time and cleaning time in the second polishing, and thus the magnetic-disk substrates of working examples and comparative examples shown in Table 1 were obtained. The properties of the main surface of the produced magnetic-disk glass substrate were measured using an AFM. As described in association with FIG. 3, the height at respective positions that divide both the x direction and the y direction of a measurement region of 1 μm square on the main surface of the produced magnetic-disk glass substrate into 512 was measured, and the average value of the squares of the inclinations at intervals of about 10 nm (precisely, 1000/512*5=9.76 nm) and the frequency at which the squares of the inclinations were 0.004 or more were calculated. It should be noted that the measurement positions were 22 mm apart from the center on the main surface, and the average value of two measurement results was calculated.

As a result, the magnetic-disk glass substrates in which the average value of the squares of the inclinations was more than 0.0025, and the magnetic-disk glass substrates in which the squares of the inclinations was 0.0025 or less and the frequency at which the squares of the inclinations were 0.004 or more was greater than 15% were used as the comparative examples (Comparative Examples 1 and 2 shown in Table 1), and the magnetic-disk glass substrates in which the squares of the inclinations was 0.0025 or less and the frequency at which the squares of the inclinations were 0.004 or more was 15% or less were used as the working examples (Working Examples 1 and 2 shown in Table 1).

It should be noted that when the arithmetic average roughness Ra of the magnetic-disk glass substrate of each working example was measured with a resolution of 512 by 512 pixels in a measurement area of 1 μm square using an AFM, all of the Ra values were 0.15 nm or less.

[Production of Magnetic Disks of Working Examples and Comparative Examples]

Next, magnetic-disks were produced using the magnetic-disk glass substrates of the working examples and comparative examples.

It should be noted that film deposition was performed on the magnetic-disk glass substrate as follows. First, an attaching layer/SUL/pre-base layer/base layer/magnetic recording layer/auxiliary recording layer/protecting layer/lubricant layer were sequentially formed on the substrate in an Ar atmosphere by a DC magnetron sputtering method using a film deposition device that had been evacuated. It should be noted that the film deposition was performed at an Ar gas pressure of 0.6 Pa unless otherwise stated. As the attaching layer, a Cr-50Ti layer with a thickness of 4 nm was formed. As the SUL, a Ru layer with a thickness of 0.7 nm and 92Co-3Ta—Zr layers with a thickness of 10 nm that sandwiched the Ru layer were formed. As the pre-base layer, a Ni-10W layer with a thickness of 8 nm was formed. As the base layer, a Ru layer with a thickness of 10 nm was formed at 0.6 Pa and then a Ru layer with a thickness of 10 nm was formed thereon at 5 Pa. As the magnetic recording layer, a 90(72Co-10Cr-18Pt)-5(SiO$_2$)-5(TiO$_2$) layer with a thickness of 15 nm was formed at 3 Pa. As the auxiliary recording layer, a 62Co-18Cr-15Pt-5B layer with a thickness of 6 nm was formed. As the protecting layer, a layer with a thickness of 4 nm was formed using C$_2$H$_4$ by a CVD method, and the surface layer was subjected to nitriding processing. As the lubricant layer, a layer with a thickness of 1 nm was formed using perfluoropolyether (PFPE) by a dip coat method.

Magnetic disks corresponding to the respective magnetic-disk glass substrates of the comparative examples and working examples were obtained through the above-described manufacturing steps.

When the grain size (diameter) of a magnetic particle in the magnetic recording layer was examined by a plane observation using a TEM, the average value was 8 nm. Moreover, when a film-formation state was checked by a cross-sectional observation using a TEM, the CrTi layer and SUL were in the amorphous state and the particle boundaries were not observed, whereas the particle boundaries were observed in the NiW layer to the auxiliary recording layer and it was observed that crystals grew to have a columnar shape.

[Evaluation of Magnetic Disks of Working Examples and Comparative Examples]

The signal-to-noise ratio (SNR) of reproduced signals from each produced magnetic disk was measured under the following conditions. It should be noted that a DFH mechanism-mounting head was used. A distance from the front end of a recording and reproducing element to the surface of the magnetic disk was set to be 1 nm by a DFH mechanism.

Linear recording density during writing signals: 2000 kbpi

Rotation rate of magnetic disk: 5400 rpm

It should be noted that the evaluation standard of an SNR was as follows when the SNR of Comparative Example 1 was given as Ref (reference). Magnetic disks evaluated as "Fair", "Good" and "Excellent" were acceptable.

Excellent: Ref+0.5 [dB]≤SNR

Good: Ref+0.3 [dB]≤SNR

Fair: Ref<SNR<Ref+0.3 [dB]

Poor: equal to or less than Ref

TABLE 1

|  | Average value of squares of inclinations | Frequency at which squares of inclinations are 0.004 or more | SNR |
| --- | --- | --- | --- |
| Comp. Ex. 1 | 0.0027 | 15% | Poor |
| Comp. Ex. 2 | 0.0024 | 19% | Poor |
| Work. Ex. 1 | 0.0025 | 15% | Fair |
| Work. Ex. 2 | 0.0019 | 10% | Good |
| Comp. Ex. 3 | 0.0022 | 17% | Poor |
| Work. Ex. 3 | 0.0019 | 12% | Fair |
| Work. Ex. 4 | 0.0015 | 8% | Good |
| Work. Ex. 5 | 0.0012 | 5% | Excellent |

It is found from the results shown in Table 1 that the working examples in which the average value of the squares of the inclinations was 0.0025 or less and the frequency at which the square numbers of the inclinations were 0.004 or more was 15% or less provided a favorable SNR for a magnetic disk. It is found that the working examples in which the frequency at which the square numbers of the inclinations were 0.004 or more was 10% or less provided a more favorable SNR for a magnetic disk. This is because the inclinations on the magnetic-disk glass substrates of the working examples are generally small and the frequency of inclusion of the large inclinations is small, and thus there are very few regions in which the crystalline orientation in the magnetic recording layer formed on the magnetic-disk glass substrate of the working examples is largely inclined from the perpendicular direction with respect to the main surface and crystals do not grow appropriately.

[Evaluation with Different Glass Composition]

Next, in order to further confirm the effect of the method for manufacturing a magnetic-disk glass substrate according to this embodiment, a 2.5-inch magnetic disk was produced from a magnetic-disk glass substrate that had a composition 2 different from the above-described composition 1. The method for producing a magnetic-disk glass substrate is the same as the case where glass has the composition 1 (that is, the above-described steps (1) to (8)). The glass composition 2 is as follows. It should be noted that the glass composition 2 is preferably for a composition of glass to be used in a magnetic-disk glass substrate to be used in a magnetic disk for energy-assisted magnetic recording.

(Glass Composition 2)

Amorphous aluminosilicate glass was used that contained $SiO_2$ in an amount of 65 mol % (64.7 mass %), $Al_2O_3$ in an amount of 6 mol % (10.13 mass %), $Li_2O$ in an amount of 1 mol % (0.5 mass %), $Na_2O$ in an amount of 9 mol % (9.24 mass %), MgO in an amount of 17 mol % (11.35 mass %), CaO in an amount of 0 mol % (0 mass %), SrO in an amount of 0 mol % (0 mass %), BaO in an amount of 0 mol % (0 mass %), and $ZrO_2$ in an amount of 2 mol % (4.08 mass %).

It should be noted that the molar ratio of the content of CaO to the total content of MgO, CaO, SrO and BaO (CaO/(MgO+CaO+SrO+BaO)) was 0, and the glass-transition temperature was 671° C.

A magnetic-disk glass substrate was produced using glass having the above-described glass composition 2 under the condition that the polishing time in the second polishing processing was the same as in Working Example 1 (Working Example 6). As a result, as Working Example 1, the average value of the squares of the inclinations was 0.0025 or less and the frequency at which the squares of the inclinations were 0.004 or more was 15% or less. Accordingly, in the case where a magnetic disk is produced using the magnetic-disk glass substrate of Working Example 6, as in Working Example 1, it is thought that there will be few regions in which the crystalline orientation in the magnetic recording layer is largely inclined from the perpendicular direction with respect to the main surface and crystals do not grow appropriately, and it can be expected to obtain the same favorable SNR as that of Working Example 1.

While the magnetic-disk glass substrate and magnetic disk according to the present invention has been described in detail, the present invention is not limited to the above-described embodiment, and it will be appreciated that various improvements and modifications can be made without departing from the concept of the present invention.

The invention claimed is:

1. A magnetic-disk glass substrate in which an average value of squares of inclinations is 0.0025 or less and a frequency at which squares of inclinations are 0.004 or more is 15% or less, in a case where samples of inclinations on a main surface are obtained at intervals of 10 nm, and the main surface being configured to receive at least a magnetic recording layer thereon.

2. The magnetic-disk glass substrate according to claim 1, wherein the frequency at which squares of inclinations are 0.004 or more is 10% or less.

3. The magnetic-disk glass substrate according to claim 2, wherein the glass substrate is made of glass having a glass-transition temperature of 650° C. or more.

4. The magnetic-disk glass substrate according to claim 2, wherein an arithmetic average roughness of the main surface is 0.15 nm or less.

5. A magnetic-disk having at least a magnetic recording layer formed on the main surface of the magnetic-disk glass substrate according to claim 2.

6. The magnetic-disk glass substrate according to claim 1, wherein the glass substrate is made of amorphous glass.

7. The magnetic-disk glass substrate according to claim 6, wherein the glass substrate is made of glass having a glass-transition temperature of 650° C. or more.

8. The magnetic-disk glass substrate according to claim 6, wherein an arithmetic average roughness of the main surface is 0.15 nm or less.

9. A magnetic-disk having at least a magnetic recording layer formed on the main surface of the magnetic-disk glass substrate according to claim 6.

10. The magnetic-disk glass substrate according to claim 1, wherein the glass substrate is made of glass having a glass-transition temperature of 650° C. or more.

11. The magnetic-disk glass substrate according to claim 10, wherein an arithmetic average roughness of the main surface is 0.15 nm or less.

12. A magnetic-disk having at least a magnetic recording layer formed on the main surface of the magnetic-disk glass substrate according to claim 10.

13. The magnetic-disk glass substrate according to claim 1, wherein an arithmetic average roughness of the main surface is 0.15 nm or less.

14. A magnetic disk having at least a magnetic recording layer formed on the main surface of the magnetic-disk glass substrate according to claim 1.

15. The magnetic-disk glass substrate according to claim 1, wherein
the magnetic-disk glass substrate is configured for use as a magnetic disk having a linear recording density of at least 2000 kbpi.

16. A magnetic-disk having at least a magnetic recording layer formed on the main surface of the magnetic-disk glass substrate according to claim 15.

\* \* \* \* \*